United States Patent
Goyez et al.

(10) Patent No.: US 12,084,171 B2
(45) Date of Patent: Sep. 10, 2024

(54) DETECTING THE STATE OF A PARKING BRAKE MEMBER

(71) Applicant: SAFRAN LANDING SYSTEMS, Velizy Villacoublay (FR)

(72) Inventors: Brian Goyez, Moissy-Cramayel (FR); Guillaume Durand, Moissy-Cramayel (FR); Eric Clairardin, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 524 days.

(21) Appl. No.: 16/891,765

(22) Filed: Jun. 3, 2020

(65) Prior Publication Data

US 2020/0377200 A1 Dec. 3, 2020

(30) Foreign Application Priority Data

Jun. 3, 2019 (FR) ..................................... 19 05845

(51) Int. Cl.
*B60T 17/22* (2006.01)
*B64C 25/44* (2006.01)
(Continued)

(52) U.S. Cl.
CPC ............ *B64C 25/44* (2013.01); *F16D 63/002* (2013.01); *F16D 2066/003* (2013.01)

(58) Field of Classification Search
CPC .. B60T 2270/406; B60T 8/885; B60T 13/741; B60T 17/22; B60T 7/042;
(Continued)

(56) References Cited

U.S. PATENT DOCUMENTS 5,587,865 A * 12/1996 Bielig ..................... B60T 8/885
361/45
5,600,237 A * 2/1997 Nippert ................. F16D 48/064
324/207.16
(Continued)

FOREIGN PATENT DOCUMENTS

| EP | 2 944 521 A1 | 11/2015 |
| FR | 2 947 599 A1 | 1/2011 |
| FR | 3 053 522 B1 | 8/2018 |

OTHER PUBLICATIONS

French Preliminary Search Report of FR 19 05845 dated Mar. 18, 2020.

*Primary Examiner* — Nicholas J Lane
*Assistant Examiner* — Stephen M Bowes
(74) *Attorney, Agent, or Firm* — Sughrue Mion, PLLC

(57) ABSTRACT

A detection method for detecting a blocked or unlocked state of a parking brake member including a bistable linear electromagnet connected both to a power supply component arranged to generate a control voltage and to a current sensor arranged to measure the control current. The detection method includes controlling the power supply component to generate a test voltage across terminals of a coil and thus generate a test current flowing in the coil, the test voltage having an amplitude less than a predetermined voltage threshold so that a test magnetic field generated by the test current does not move a shuttle, acquiring measurements of the test current as produced by the current sensor, analyzing the measurements of the test current, and detecting the blocked or unlocked state of the parking brake member based on the analysis.

6 Claims, 8 Drawing Sheets

(51) Int. Cl.
    *F16D 63/00*     (2006.01)
    *F16D 66/00*     (2006.01)

(58) Field of Classification Search
    CPC ............. B66B 5/0037; F16D 2066/003; F16D 63/002; B64C 25/44
    See application file for complete search history.

(56) References Cited

U.S. PATENT DOCUMENTS

| | | | | |
|---|---|---|---|---|
| 5,691,591 | A * | 11/1997 | McCann | H02P 6/16 318/696 |
| 5,942,892 | A * | 8/1999 | Li | H01F 7/1844 324/207.16 |
| 9,640,311 | B1 * | 5/2017 | Kordik | B60T 8/1703 |
| 2006/0163939 | A1 * | 7/2006 | Kuramochi | B60T 8/885 303/122.04 |
| 2007/0030619 | A1 * | 2/2007 | Ganev | H01F 7/1844 361/160 |
| 2007/0163849 | A1 * | 7/2007 | Knop | F16D 65/18 188/106 P |
| 2007/0240947 | A1 * | 10/2007 | Goss | B60T 7/107 188/158 |
| 2013/0241454 | A1 * | 9/2013 | Nemeth-Csoka | H02P 21/18 318/400.33 |
| 2014/0002093 | A1 * | 1/2014 | Elliott | G01R 31/3278 324/423 |
| 2015/0128689 | A1 * | 5/2015 | Cahill | G01L 5/28 73/121 |
| 2015/0266568 | A1 * | 9/2015 | Evenor | B64C 25/42 188/162 |
| 2015/0292911 | A1 * | 10/2015 | Slanker | B60T 17/18 324/207.16 |
| 2017/0102425 | A1 * | 4/2017 | Hao | G01R 31/346 |
| 2018/0005744 | A1 * | 1/2018 | Durand | H01F 7/1872 |
| 2020/0180906 | A1 * | 6/2020 | Li | B66D 5/08 |

* cited by examiner

[Fig.1]
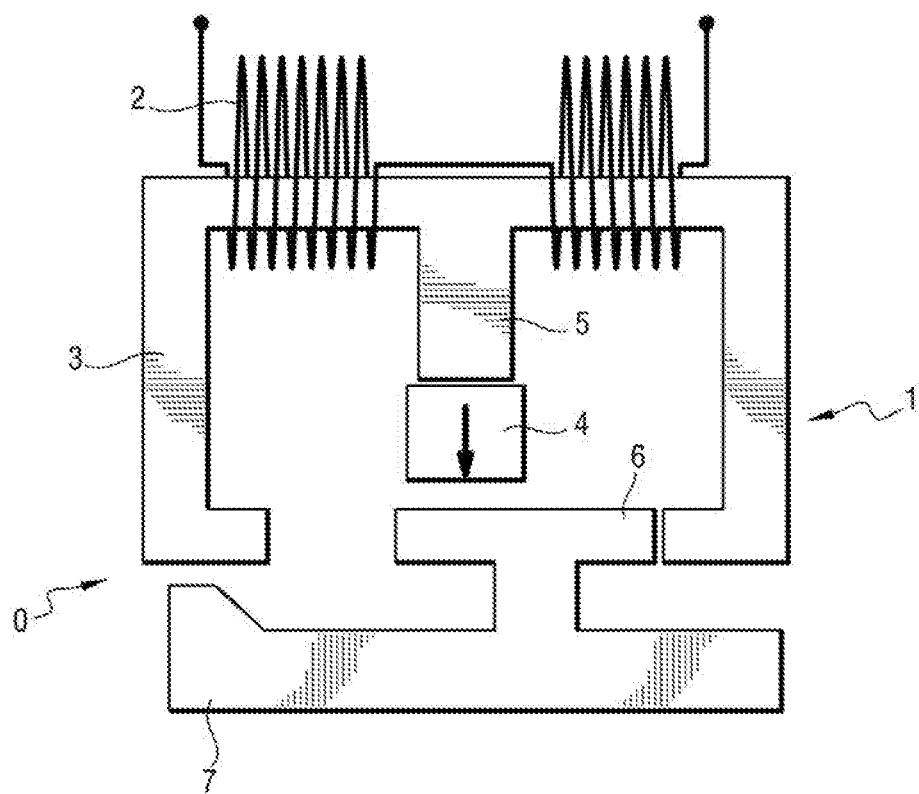

[Fig.2]
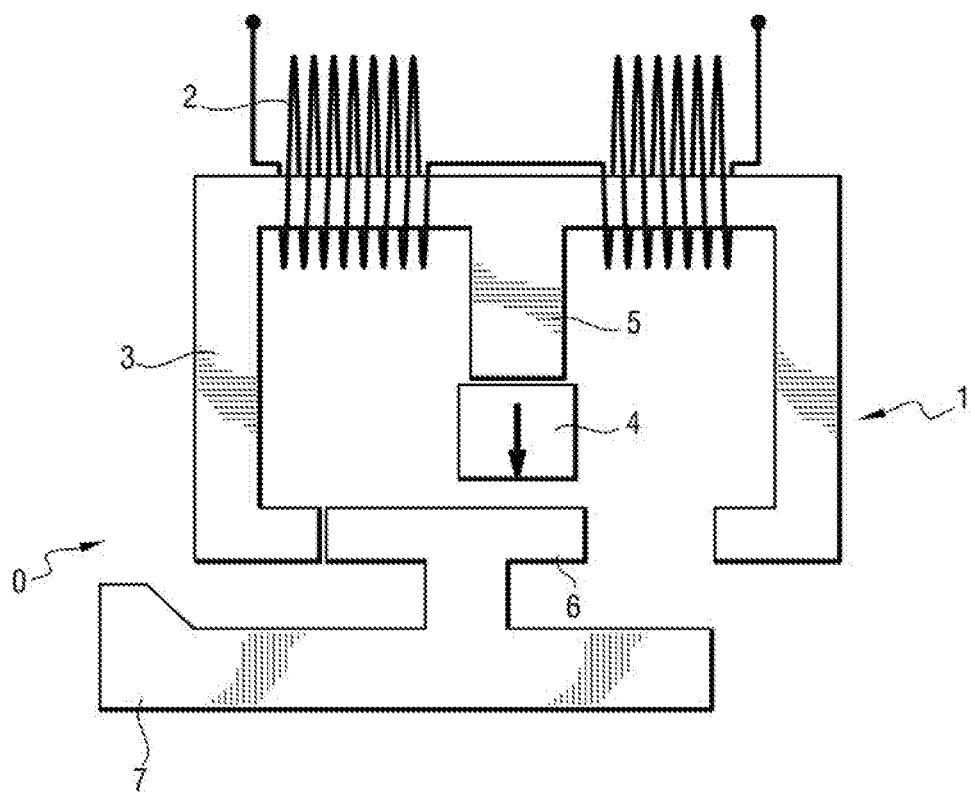

[Fig.3]
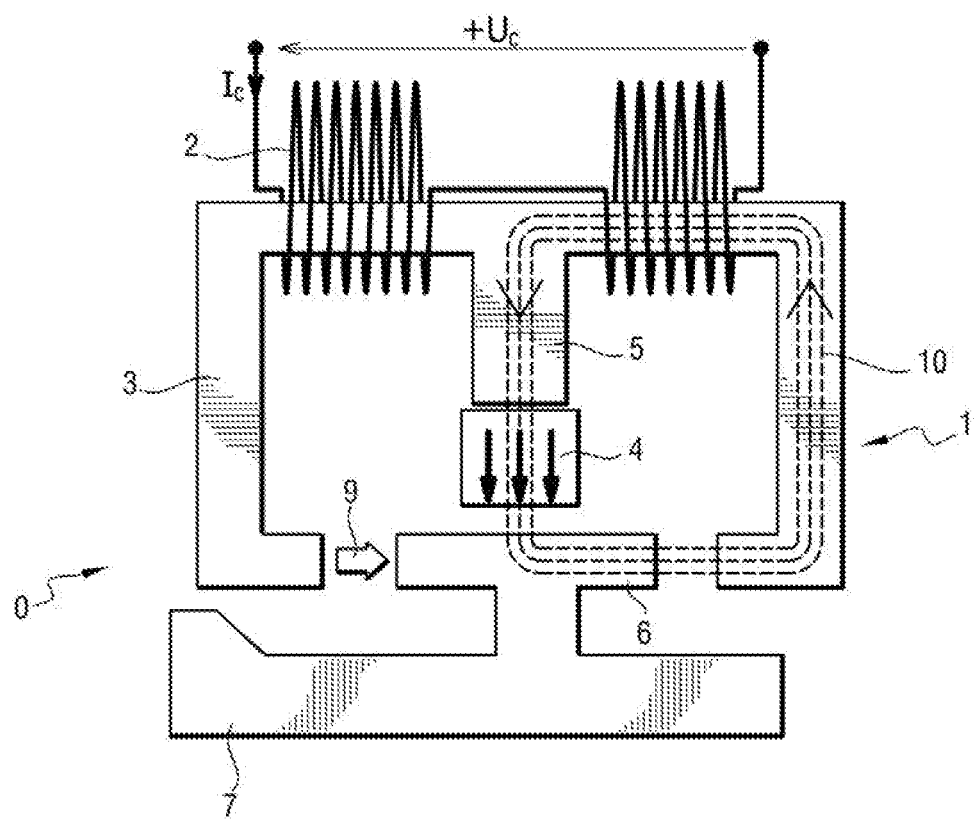

[Fig.4]
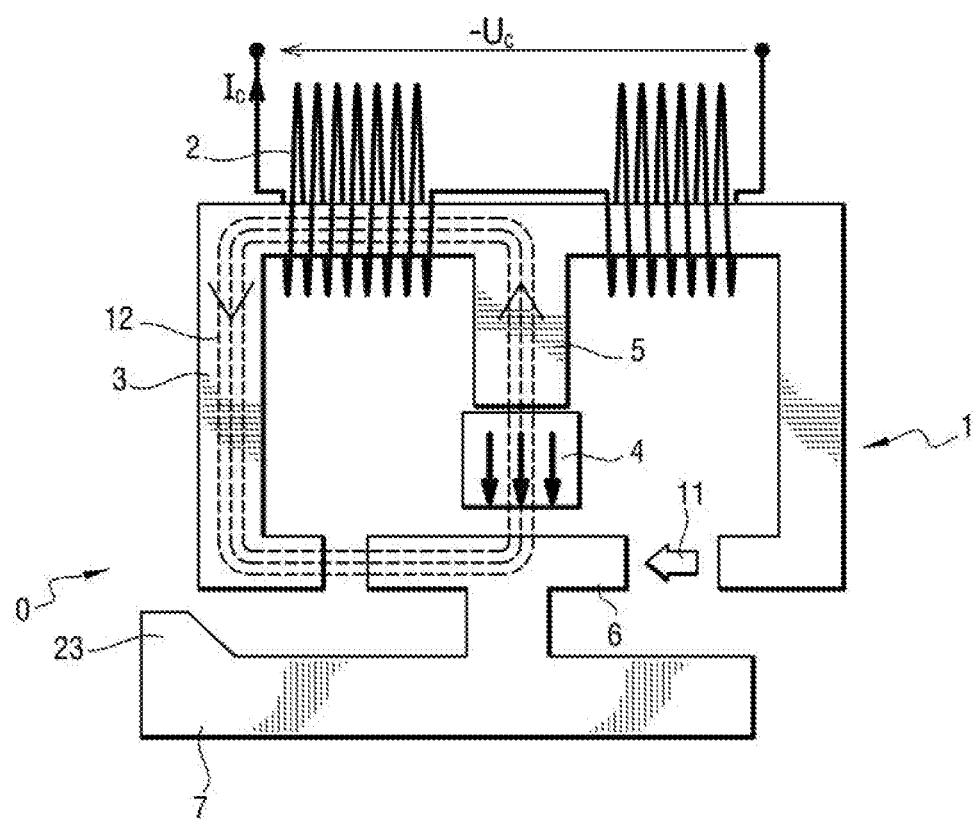

[Fig.5]
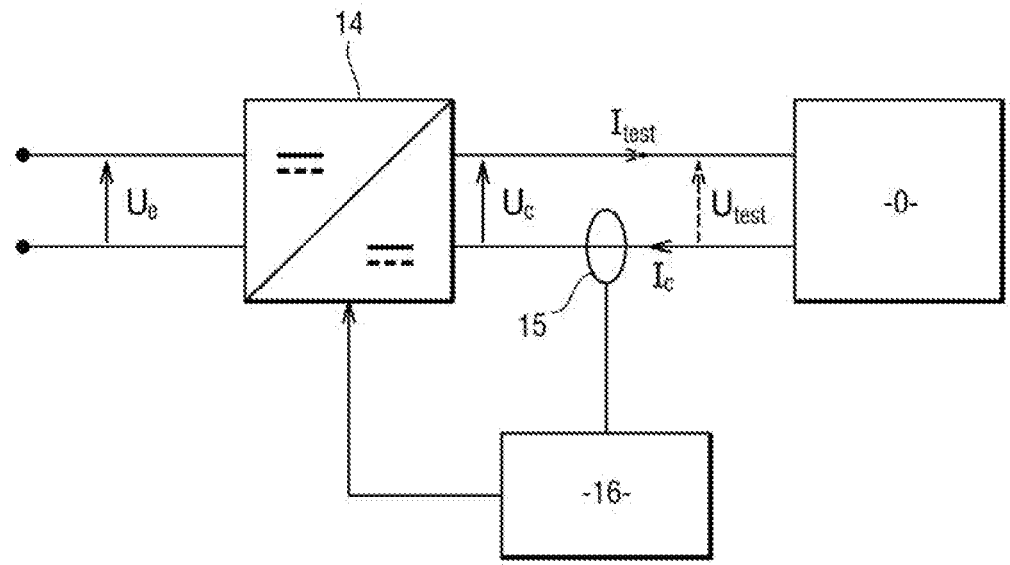
[Fig.6]
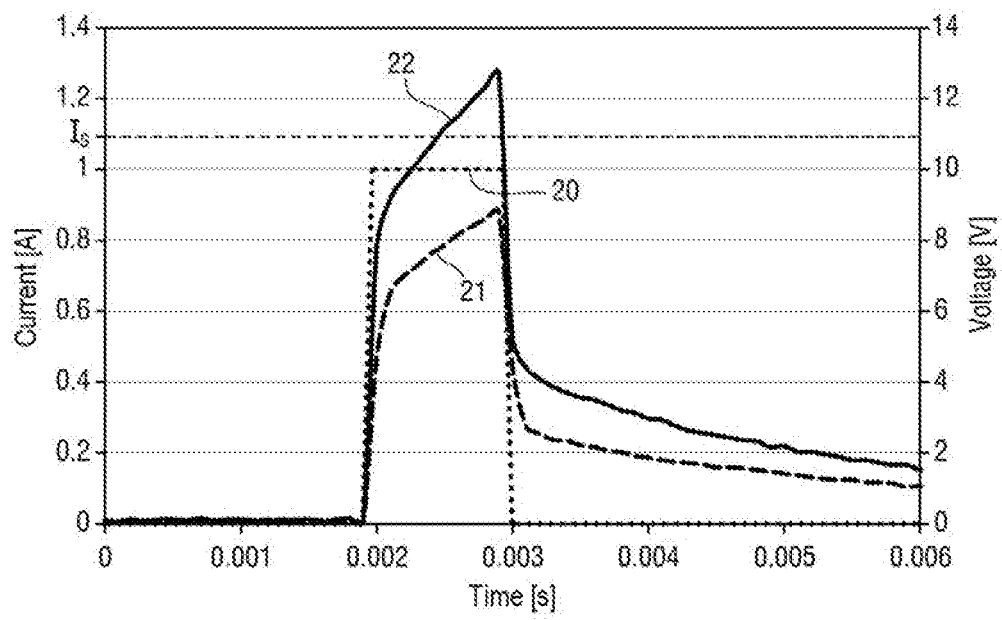

[Fig.7]
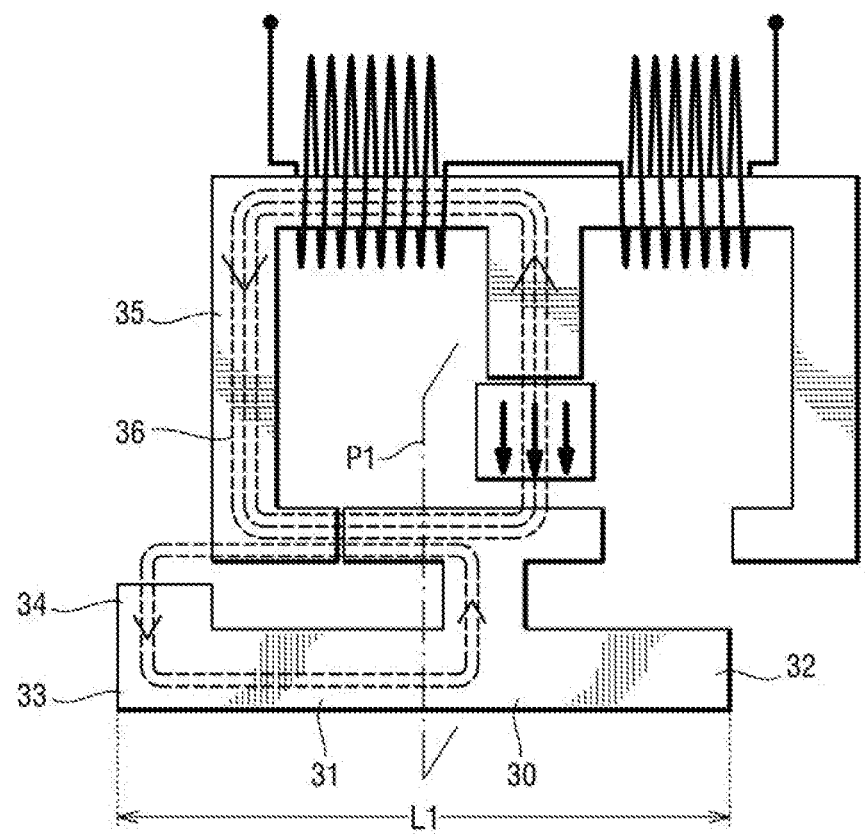

[Fig.8]
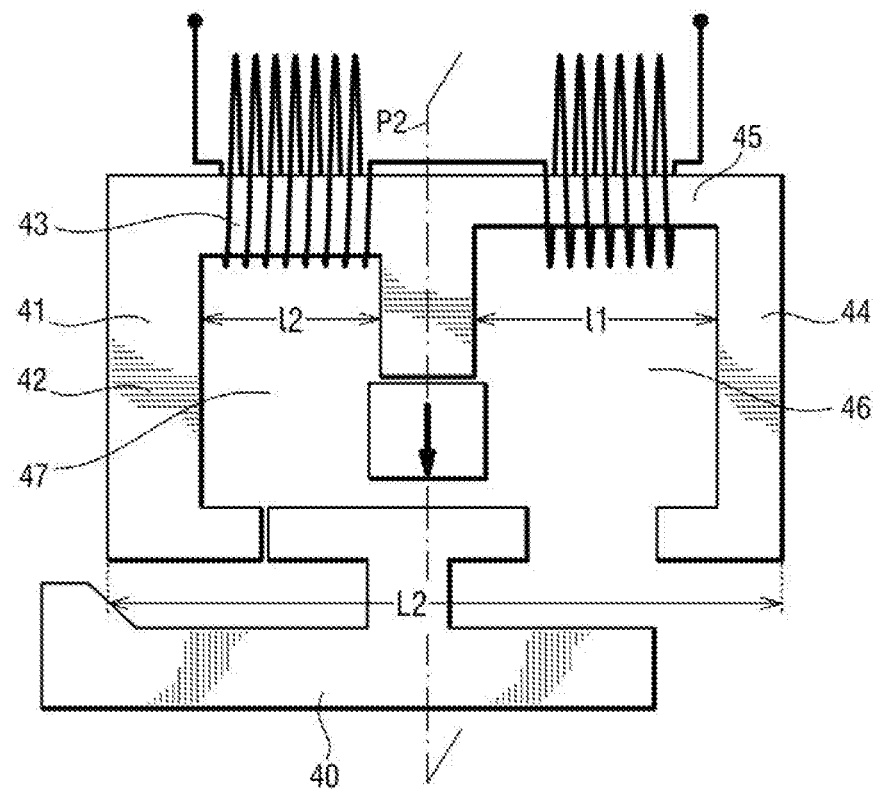

[Fig.9]
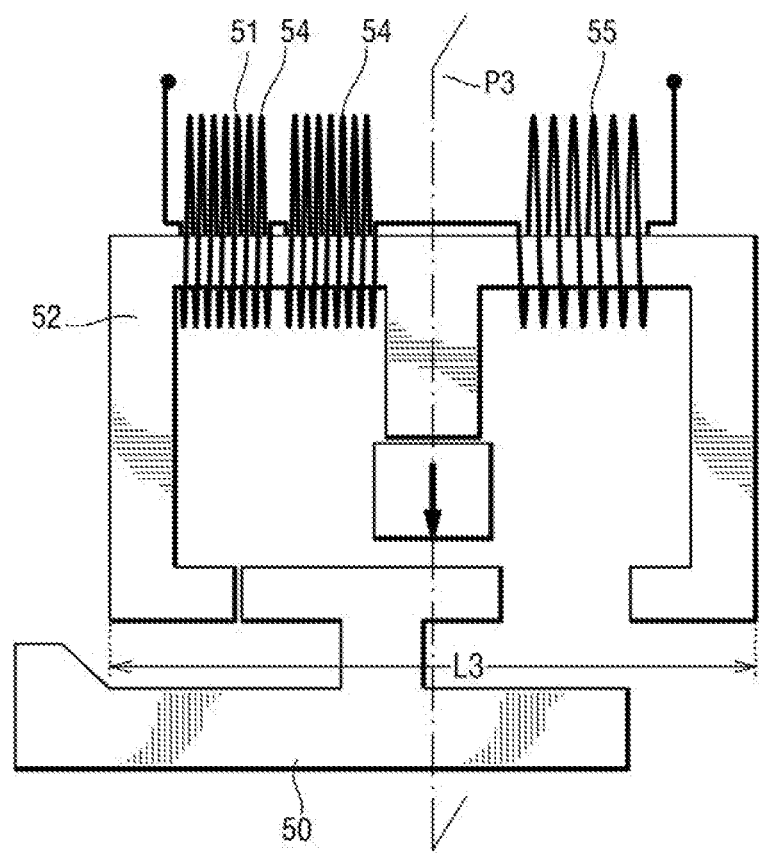

DETECTING THE STATE OF A PARKING BRAKE MEMBER

BACKGROUND OF THE INVENTION

Modern aircraft, such as airplanes or helicopters, conventionally include brake systems for braking so-called "braked" wheels of the aircraft. The brake system comprises a plurality of brakes, each serving to brake one of the braked wheels of the aircraft. Each brake comprises one or more friction members, e.g. a stack of carbon disks, and one or more brake actuators. Brake actuators are generally either electromechanical actuators, with the system then being said to be an "electric" brake system, or else hydraulic actuators, with the system then being said to be a "hydraulic" brake system.

In an electric brake system, each electromechanical brake actuator includes an electric motor and a screw-and-nut assembly having one of its elements driven in rotation by the electric motor and its other element constrained to slide without rotating in order to exert a pressing force selectively on the friction members.

In order to keep the aircraft stationary when parked, the pressing force needs to be maintained even while the electric motor of the electromechanical brake actuator is unpowered.

The electromechanical brake actuator is thus provided with a parking brake member.

The parking brake members normally used may be classified in two families: monostable parking brake members and bistable parking brake members.

A monostable parking brake member is also referred to as a "failsafe" brake. The failsafe brake releases the shaft of the electric motor while it is electrically powered, and locks it when no longer powered.

In a bistable parking brake member, an electrical pulse serves to block the shaft of the electric motor, and an opposite pulse releases it.

Among other advantages, bistable parking brake members present the advantage of consuming less electrical energy.

This document relates to bistable parking brake members.

A bistable parking brake member comprises a bistable linear electromagnet having at least one coil and a shuttle mounted to slide between two extreme positions, each corresponding to a respective one of the blocked and unlocked states of the bistable parking brake member.

The logic implemented in the software of an electric brake system that includes a bistable parking brake needs to know the real state of the parking brake member, and thus the real position of the shuttle of the bistable linear electromagnet. Specifically, the real state of the parking brake member might be different from its controlled state, in particular when the parking brake member has suffered a failure having the consequence of blocking the shuttle in any position.

Patent FR 3 053 522 B1 describes a bistable linear electromagnet comprising a hollow body, a coil, and a shuttle mounted to slide in the hollow body under the effect of a magnetic field generated by the coil. A magnetic field sensor is positioned in a cavity in a wall of the hollow body, and serves to measure a magnetic flux in order to determine the position of the shuttle.

Using such a magnetic sensor presents undeniable advantages, but it also presents a certain cost, and tends to increase the weight and the volume and (at least in theory) to reduce the reliability of the parking brake member.

OBJECT OF THE INVENTION

An object of the invention is to detect the blocked or unlocked state of a bistable parking brake member of a brake of an aircraft wheel, without increasing the weight or the volume of the bistable parking brake member, and without reducing its reliability.

SUMMARY OF THE INVENTION

In order to achieve this object, there is provided a detection method for detecting the blocked or unlocked state of a parking brake member of a brake of an aircraft wheel, the parking brake member including a bistable linear electromagnet comprising a ferromagnetic torus, a coil, a permanent magnet, and a shuttle connected to a rod, the shuttle being mounted in the ferromagnetic torus to slide between two extreme positions situated on opposite sides of the permanent magnet and corresponding respectively to an extended position and to a retracted position for the rod, the parking brake member being connected both to a power supply component arranged to generate a control voltage across the terminals of the coil so that a control current flows in the coil and generates a control magnetic field that moves the shuttle between the two extreme positions, and also to a current sensor arranged to measure the control current, the detection method comprising the steps of:
 controlling the power supply component to generate a test voltage across the terminals of the coil and thus generate a test current flowing in the coil, the test voltage having an amplitude less than a predetermined voltage threshold so that a test magnetic field generated by the test current does not move the shuttle;
 acquiring measurements of the test current as produced by the current sensor; and
 analyzing the measurements of the test current and detecting the blocked or unlocked state of the parking brake member on the basis of this analysis.

The detection method of the invention is applied to a bistable parking brake member comprising a bistable linear electromagnet connected both to a power supply component that generates the control voltage and also to a current sensor that measures the control current.

The detection method is thus performed by using the power supply component and the current sensor that are already used for controlling the bistable parking brake member, and thus without adding any additional "hardware" component, such as a sensor, for example. Implementing the detection method therefore does not reduce the reliability of the parking brake member, nor does it increase its volume, its weight, or its cost.

There is also provided a detection method as described above, wherein the test voltage comprises a voltage level and wherein the analysis of the measurements of the test current comprises the step of comparing an amplitude of the test current with a first predetermined current threshold.

There is also provided a detection method as described above, wherein the analysis of the measurements of the test current is frequency analysis.

There is also provided a detection method as described above, wherein the frequency analysis comprises the step of comparing the amplitude of at least one harmonic of the test current with a second predetermined current threshold.

There is also provided a parking brake system comprising a parking brake member, a power supply component, a current sensor, and a processor component, the parking brake member including a bistable linear electromagnet comprising a ferromagnetic torus, a coil, a permanent magnet, and a shuttle connected to a rod, the shuttle being mounted in the ferromagnetic torus to slide between two extreme positions situated on opposite sides of the permanent magnet and corresponding respectively to an extended position and to a retracted position for the rod, the parking brake member being connected both to the power supply component, which is arranged to generate a control voltage across the terminals of the coil so that a control current flows in the coil and generates a control magnetic field that moves the shuttle between the two extreme positions, and also to the current sensor, which is arranged to measure the control current, the above-described detection method being implemented in the processor component.

There is also provided a parking brake system as described above, wherein the rod presents a first shape that is asymmetric about a first midplane orthogonal to the sliding direction of the rod, in such a manner as to accentuate magnetic asymmetry between a first magnetic circuit corresponding to the rod in the retracted position and a second magnetic circuit corresponding to the rod in the extended position, which first midplane is a midplane of the rod.

There is also provided a parking brake system as described above, wherein the ferromagnetic torus presents a second shape that is asymmetric about a second midplane orthogonal to the sliding direction of the rod, in such a manner as to accentuate magnetic asymmetry between a first magnetic circuit corresponding to the rod in the retracted position and a second magnetic circuit corresponding to the rod in the extended position, which second midplane is a midplane of the ferromagnetic torus.

There is also provided a parking brake system as described above, wherein the coil is wound on the ferromagnetic torus in an arrangement that is asymmetric about a third midplane orthogonal to the sliding direction of the rod, in such a manner as to accentuate magnetic asymmetry between a first magnetic circuit corresponding to the rod in the retracted position and a second magnetic circuit corresponding to the rod in the extended position, which third midplane is a midplane of the ferromagnetic torus.

There is also provided an electromechanical actuator comprising a casing and a parking brake system as described above, the parking brake system being incorporated in the casing.

The invention can be better understood in the light of the following description of a particular, nonlimiting embodiment of the invention.

BRIEF DESCRIPTION OF THE DRAWINGS

Reference is made to the accompanying drawings, in which:

FIG. 1 shows a bistable linear electromagnet in a first embodiment of a parking brake member in an unlocked state;

FIG. 2 shows the bistable linear electromagnet of the parking brake member in a blocked state;

FIG. 3 shows the bistable linear electromagnet while the parking brake member is going from the blocked state to the unlocked state;

FIG. 4 shows the bistable linear electromagnet while the parking brake member is going from the unlocked state to the blocked state;

FIG. 5 shows a power supply component, a current sensor, and a processor component that are connected to the parking brake member;

FIG. 6 is a graph plotting a curve for a test voltage, a curve for a test current corresponding to the unlocked state of the parking brake member, and a curve for the test current corresponding to the blocked state of the parking brake member;

FIG. 7 shows a bistable linear electromagnet in a second embodiment of a parking brake member in a blocked state;

FIG. 8 shows a bistable linear electromagnet in a third embodiment of a parking brake member in a blocked state; and FIG. 9 shows a bistable linear electromagnet in a fourth embodiment of a parking brake member in a blocked state.

DETAILED DESCRIPTION OF THE INVENTION

With reference to FIGS. 1 and 2, an electromechanical brake actuator of a brake of an aircraft wheel includes an electric motor and a parking brake member 0 comprising a bistable linear electromagnet 1 in a first embodiment.

The bistable linear electromagnet 1 includes a coil 2, an E-shaped ferromagnetic torus 3, a permanent magnet 4 fastened to one end of the central branch 5 of the E-shape, and a shuttle 6 that is movable and connected to a rod 7. The rod 7 co-operates with a dog connected to an outlet shaft of the electric motor of the electromechanical brake actuator.

The rod 7 slides between a retracted position, as shown in FIG. 1, in which the parking brake member 0 is in an unlocked state and in which the outlet shaft of the electric motor is released, and an extended position, as shown in FIG. 2, in which the parking brake member 0 is in a blocked state and in which the outlet shaft of the electric motor is blocked.

The rod 7 is driven by the shuttle 6, which is mounted to slide in the torus 3 between a first extreme position, corresponding to the retracted position of the rod 7, and a second extreme position, corresponding to the extended position of the rod 7. The term "in the torus 3" is used herein to mean that at least a portion of the shuttle 6 is situated inside a volume defined by the outer envelope of the torus 3.

With reference to FIG. 3, when the parking brake member 0 is in the blocked state and is to be caused to switch to the unlocked state, a control voltage $+U_c$ is applied to the terminals of the coil 2. In this example, the control voltage $+U_c$ is a direct current (DC) voltage that is applied as a pulse. A DC control current $I_c$ then flows in the coil 2 and generates a control magnetic field in the torus 3, which attracts the shuttle 6 towards its first extreme position: the shuttle 6 moves in the direction of arrow 9.

Magnetic flux, resulting from the control magnetic field, is generated in the torus 3. The magnetic flux is symbolized by field lines 10.

When the shuttle 6 is in the first extreme position and the rod 7 is in the retracted position, the parking brake member 0 is in the unlocked state. Once the shuttle 6 has moved, there is no longer any need to power the parking brake member 0 since the permanent magnet 4 maintains a magnetic field that holds the shuttle 6 stationary.

With reference to FIG. 4, when the parking brake member 0 is in the unlocked state and is to be caused to switch to the blocked state, a control voltage $-U_c$ is applied to the terminals of the coil 2. The control voltage $-U_c$ is applied as a pulse. A control current $I_c$ then flows in the coil 2 in the direction opposite to that of FIG. 3 and generates a control magnetic field in the torus 3, which attracts the shuttle 6 towards its second extreme position: the shuttle 6 moves in the direction of arrow 11.

Magnetic flux, resulting from the control magnetic field, is generated in the torus 3. The magnetic flux is symbolized by field lines 12.

When the shuttle 6 is in the second extreme position and the rod 7 is in the extended position, the parking brake member 0 is in the blocked state. Once the shuttle 6 has moved, there is no longer any need to power the parking brake member 0 since the permanent magnet 4 maintains a magnetic field that holds the shuttle 6 stationary.

With reference to FIG. 5, the parking brake member 0 is connected to a power supply component 14, specifically a DC/DC converter, which generates the control voltage (+/−) $U_c$ from an input voltage $U_e$. In this example, the input voltage $U_e$ is higher than the control voltage $U_c$ and may be equal to 20 volts (V), 50 V, 270 V, or even more.

The control current $I_c$ is measured by a current sensor 15.

A processor component 16 acquires the measurements of the control current $I_c$. By way of example, the processor component 16 may comprise a microcontroller, a processor, a programmable logic circuit of the application-specific integrated circuit (ASIC) type or of the field-programmable gate array (FPGA) type, etc.

The processor component 16 uses the measurements of the control current $I_c$ to adjust the control voltage $U_c$. The processor component 16 also uses the measurements of the control current $I_c$ to monitor the parking brake member 0, e.g. by detecting a short-circuit, if any.

There follows a description of the detection method of the invention. The detection method seeks to detect the "real" blocked or unlocked state of the parking brake member 0.

The processor component 16 controls the power supply component 14 so that it generates a test voltage $U_{test}$ across the terminals of the coil 2, and thus a test current $I_{test}$ flowing in the coil 2. The blocked or unlocked state of the parking brake member 0 is detected by analyzing measurements of the test current $I_{test}$.

The test voltage $U_{test}$ and the test current $I_{test}$ are defined in such a manner that the distinction between the first extreme position and the second extreme position is as reliable as possible.

The test voltage $U_{test}$ must be of an amplitude that is high enough to ensure that disturbances in the test current $I_{test}$ are negligible and that it can be measured in accurate manner.

The test voltage $U_{test}$ must be of an amplitude that is low enough to ensure that when the test voltage $U_{test}$ is applied, a test magnetic field as generated by the test current $I_{test}$ does not move the shuttle 6. Thus, when the test voltage $U_{test}$ is applied, the shuttle 6 remains stationary, or possibly is subjected to movement of amplitude that is very small and insufficient to cause it to go from one extreme position to the other. The test voltage $U_{test}$ is thus less than a predetermined voltage threshold. In this example, the test voltage $U_{test}$ is less than the trigger threshold of the bistable linear electromagnet 1, with a margin of a few volts in order to accommodate tolerance variations. For example, when considering a bistable linear electromagnet 1 that has a trigger threshold of 14 V, the amplitude of the test voltage $U_{test}$ may be equal to 10 V.

Thereafter, the processor component 16 acquires measurements of the test current $I_{test}$ as produced by the current sensor 15.

The processor component 16 then analyzes the measurements of the test current $I_{test}$ and detects the blocked or unlocked state of the parking brake member 0 from that analysis. The processor component 16 then transmits that information to "higher level" (i.e. system level) control members of the electric brake system and/or of the aircraft.

With reference to FIG. 6 and by way of example, the test voltage $U_{test}$ (curve 20) comprises a voltage level of 10 V. The analysis of the measurements of the test current $I_{test}$ consists in comparing the amplitude of the test current $I_{test}$ with a first predetermined current threshold $I_s$: when the maximum amplitude of the test current $I_{test}$ is less than or equal to $I_s$ (curve 21), the parking brake member 0 is in the unlocked state, and when the maximum amplitude of the test current $I_{test}$ is greater than $I_s$ (curve 22), the parking brake member 0 is in the blocked state.

Rather than using the maximum amplitude, it is naturally possible to compare some other characteristic amplitude of the test current $I_{test}$, e.g. a mean amplitude or an amplitude at a given time T.

The test voltage $U_{test}$ need not necessarily be a voltage level, but could be a sine wave of amplitude $A_{test}$ and of frequency $F_{test}$. The test current $I_{test}$ would then be a sine wave of amplitude and phase that are specific to each extreme position of the shuttle 6.

The test voltage $U_{test}$ could be more complex and comprise a square wave signal, a triangular wave signal, a Dirac pulse, a mixture of these signals, etc.

The analysis of the test current $I_{test}$ could be frequency analysis. Under such circumstances, the amplitude of at least one harmonic of the test current $I_{test}$ is compared with a second predetermined current threshold. This comparison serves to determine the extreme position in which the shuttle 6 is located.

The test current $I_{test}$ may be subjected to both time and frequency analysis in order to make the result more robust.

The differences that exist between the test current $I_{test}$ when the shuttle 6 is in the first extreme position and when the shuttle 6 is in the second extreme position result from the fact that the test magnetic field is not identical in both situations because there exists magnetic asymmetry between a first magnetic circuit corresponding to the rod 7 in the retracted position and a second magnetic circuit corresponding to the rod 7 in the extended position.

The magnetic asymmetry is due to the influence of the permanent magnet 4 that opposes the test magnetic field in one situation and that intensifies it in the other situation.

The magnetic asymmetry is also due to the asymmetry of the rod 7. Specifically, even if not visible in the figures, there are magnetic field lines that pass via the head 23 that is located at one end of the rod 7, its other end not having a head.

The inductance seen from the terminals of the parking brake member 0 is thus not identical in both extreme positions of the shuttle 6, and the test current $I_{test}$ for a given test voltage $U_{test}$, therefore does not have the same waveform and the same amplitude in both of the extreme positions.

Advantageously, and with reference to FIG. 7, in order to accentuate the differences between the test currents $I_{test}$ in the two positions, the magnetic asymmetry is accentuated between a first magnetic circuit corresponding to the rod 30 in the retracted position and a second magnetic circuit corresponding to the rod 30 in the extended position. For this purpose, the rod 30 is given a first shape that is asymmetric about a first midplane P1 perpendicular to the sliding direction of the rod 30, this first midplane being a midplane of the rod 30. The term "midplane" is used here to mean a plane intersecting the rod 30 in the middle of its length L1.

It can thus be seen in FIG. 7 that the rod 30 presents a main portion 31 that extends between a first end 32 of the rod 30 and a second end 33 of the rod 30, together with an end portion 34 that is situated at the second end 33 and that extends perpendicularly to the main portion 31. The end portion 34 extends in the immediate proximity of the torus 35 so as to form a magnetic path for the field lines 36 when the rod 30 is in the extended position, as shown in FIG. 7.

Also advantageously, and with reference to FIG. 8, in order to accentuate the differences between the test currents $I_{test}$ in the two positions, the magnetic asymmetry is accentuated between a first magnetic circuit corresponding to the rod 40 in the retracted position and a second magnetic circuit corresponding to the rod 40 in the extended position. For this purpose, the torus 41 is given a second shape that is asymmetric about a second midplane P2 perpendicular to the sliding direction of the rod 40, this second midplane being a midplane of the torus 41. The term "midplane" is used here to mean a plane intersecting the torus 41 in the middle of its length L2.

It can thus be seen in FIG. 8 that the branches 42 and 43 of the torus 41 are greater in thickness than the branches 44 and 45. It can also be seen that the width l1 of the internal cavity 46 is greater than the width l2 of the internal cavity 47.

Also advantageously, and with reference to FIG. 9, in order to accentuate the differences between the test currents $I^{test}$ in the two positions, the magnetic asymmetry is accentuated between a first magnetic circuit corresponding to the rod 50 in the retracted position and a second magnetic circuit corresponding to the rod 50 in the extended position. For this purpose, the coil 51 is wound on the ferromagnetic torus 52 in an arrangement that is asymmetric about a third midplane P3 perpendicular to the sliding direction of the rod 50, this third midplane being a midplane of the torus 52. The term "midplane" is used here to mean a plane intersecting the torus 52 in the middle of its length L3.

It can thus be seen in FIG. 9 that the coil 51 has two windings 54 situated on one side of the third midplane P3 and one winding 55 situated on the other side of the third midplane P3.

It should also be observed that the magnet and/or the shuttle could be caused to be asymmetric.

It would naturally possible to apply a plurality of these asymmetric arrangements to a single bistable linear electromagnet (i.e. to its rod, its coil, its torus, its magnet, its shuttle).

It should also be observed that the effect of the magnetic asymmetry could be increased by increasing the size of the magnet.

The invention as described above thus makes it possible to determine the real state of an existing parking brake member without needing to modify its hardware. Detection is performed by means of a modification only to the software of the processor component, which is particularly advantageous in terms of reliability, weight, volume, and cost.

It should be observed that the power supply component 14, the current sensor 15, and the processor component 16 in this example are incorporated in a housing of the electromechanical brake actuator. This configuration corresponds to a distributed architecture for the electric brake system, with the control electronics being located as close as possible to the actuators. Naturally, the invention applies in the same manner to a "centralized" architecture in which the power supply component 14, the current sensor 15, and the processor component 16 are situated in calculation means positioned in the fuselage of the aircraft.

The invention is particularly advantageous in an architecture that is distributed. Specifically, the electronics are incorporated in the housing of the electromechanical brake actuator and are therefore located on the brake and thus in an environment that is constrained and severe. Adding hardware in such an environment is particularly complicated and tends to reduce the reliability of the electromechanical brake actuator. Being able to detect the real state of the parking brake member without any additional component is thus very advantageous in this architecture.

Naturally, the invention is not limited to the embodiment described, but covers any variant coming within the ambit of the invention as defined by the claims.

As described, the invention is implemented in a parking brake member of an electromechanical brake actuator of an electric brake system. Nevertheless, it could also be implemented in a hydraulic brake system. In a hydraulic brake system, each hydraulic actuator could be connected to a pressure source via a normal hydraulic brake circuit and via a parking hydraulic brake circuit. Conventionally, the parking hydraulic brake circuit includes a parking valve having an outlet port adapted to be connected selectively either to the pressure source or to a return circuit at a pressure that is low relative to said high pressure.

The parking valve may be operated by a bistable linear electromagnet having a rod that slides between an extended position and a retracted position. Under such circumstances, the "parking brake member" comprises both the parking valve and the bistable linear electromagnet.

The state of the parking valve is detected by the detection method of the invention.

The invention claimed is:

1. A detection method for detecting a blocked or unlocked state of a parking brake member of a brake of an aircraft wheel, the detection method comprising:

controlling a power supply component connected to a parking brake member comprising a bistable linear electromagnet comprising a ferromagnetic torus, a coil, a permanent magnet, and a shuttle connected to a rod, the shuttle being mounted in the ferromagnetic torus to slide between two extreme positions situated on opposite sides of the permanent magnet and corresponding respectively to an extended position and to a retracted position for the rod, to generate a test voltage across the terminals of the coil to generate a test current flowing in the coil, the test voltage having an amplitude less than a predetermined voltage threshold so that a test magnetic field generated by the test current does not move the shuttle;

acquiring measurements of the test current from a current sensor connected to the parking brake member; and analyzing the measurements of the test current and detecting the blocked or unlocked state of the parking brake member based on the analyzing, wherein the test voltage comprises a voltage level and wherein the analyzing comprises comparing an amplitude of the test current with a first predetermined current threshold, or wherein the measurements are analyzed using frequency analysis, said frequency analysis comprising comparing an amplitude of at least one harmonic of the test current with a second predetermined current threshold.

2. A parking brake system comprising a parking brake member, a power supply component, a current sensor, and a processor component, the parking brake member comprising a bistable linear electromagnet comprising a ferromagnetic torus, a coil, a permanent magnet, and a shuttle connected to a rod, the shuttle being mounted in the ferromagnetic torus to slide between two extreme positions situated on opposite sides of the permanent magnet and corresponding respectively to an extended position and to a retracted position for the rod, the parking brake member being connected both to the power supply component, which is arranged to generate a control voltage across terminals of the coil so that a control current flows in the coil and generates a control magnetic field that moves the shuttle between the two extreme positions, and also to the current sensor, which is arranged to measure the control current, the processor component being configured to:
  control the power supply component to generate a test voltage across the terminals of the coil and generate a test current flowing in the coil, the test voltage having an amplitude less than a predetermined voltage threshold so that a test magnetic field generated by the test current does not move the shuttle;
  acquire measurements of the test current from the current sensor; and
  analyze the measurements of the test current and detect the blocked or unlocked state of the parking brake member based on the analysis,
wherein the test voltage comprises a voltage level and wherein the analyzing comprises comparing an amplitude of the test current with a first predetermined current threshold, or
wherein the measurements are analyzed using frequency analysis, said frequency analysis comprising comparing an amplitude of at least one harmonic of the test current with a second predetermined current threshold.

3. The parking brake system according to claim 2, wherein the rod presents a first shape that is asymmetric about a first midplane orthogonal to a sliding direction of the rod, to accentuate magnetic asymmetry between a first magnetic circuit corresponding to the rod in the retracted position and a second magnetic circuit corresponding to the rod in the extended position, wherein the first midplane is a midplane of the rod.

4. The parking brake system according to claim 2, wherein the ferromagnetic torus presents a second shape that is asymmetric about a second midplane orthogonal to a sliding direction of the rod, to accentuate magnetic asymmetry between a first magnetic circuit corresponding to the rod in the retracted position and a second magnetic circuit corresponding to the rod in the extended position, wherein the second midplane is a midplane of the ferromagnetic torus.

5. The parking brake system according to claim 2, wherein the coil is wound on the ferromagnetic torus in an arrangement that is asymmetric about a third midplane orthogonal to a sliding direction of the rod, to accentuate magnetic asymmetry between a first magnetic circuit corresponding to the rod in the retracted position and a second magnetic circuit corresponding to the rod in the extended position, wherein the third midplane is a midplane of the ferromagnetic torus.

6. An electromechanical actuator comprising a casing and the parking brake system according to claim 2, wherein the parking brake system is incorporated in the casing.

* * * * *